United States Patent [19]

Schmieder et al.

[11] 4,101,408
[45] Jul. 18, 1978

[54] COUNTERCURRENT EXTRACTION COLUMN FOR LIQUID-LIQUID EXTRACTION

[75] Inventors: Helmut Schmieder, Karlsruhe; Hubert Goldacker, Hochstetten; Werner Roos, Leimersheim, all of Fed. Rep. of Germany

[73] Assignee: Gesellschaft für Kernforschung m.b.H., Karlsruhe, Fed. Rep. of Germany

[21] Appl. No.: 757,062

[22] Filed: Dec. 30, 1976

[30] Foreign Application Priority Data

Dec. 31, 1975 [DE] Fed. Rep. of Germany ....... 2559337

[51] Int. Cl.² ............................................... C25C 7/00
[52] U.S. Cl. ................................. 204/272; 204/273; 204/289; 204/299 R; 204/302
[58] Field of Search ............... 204/273, 272, 260, 299, 204/302, 304, 305, 306, 180 R, 289, 269, 275

[56] References Cited

U.S. PATENT DOCUMENTS

| 2,050,301 | 8/1936 | Fisher | 204/299 R |
| 3,198,720 | 8/1965 | Knippers et al. | 204/272 X |
| 3,415,735 | 12/1968 | Brown et al. | 204/302 |
| 3,492,217 | 1/1970 | Keeler et al. | 204/272 |
| 3,507,770 | 4/1970 | Fleming | 204/272 |
| 3,793,177 | 2/1974 | Baumgartner et al. | 204/269 |
| 3,843,507 | 10/1974 | Kwan | 204/302 |
| 3,869,374 | 3/1975 | Goldacker et al. | 204/275 X |

Primary Examiner—Arthur C. Prescott
Attorney, Agent, or Firm—Spencer & Kaye

[57] ABSTRACT

A countercurrent extraction column for a liquid-liquid extraction of two phases which are insoluble in each other with simultaneous electrolysis. The column comprises an outer tube, an inner tube within the outer tube, with the inner tube dividing the column into an inner anode chamber and an outer cathode chamber which encloses the anode chamber without the use of a diaphragm. A plurality of bores establish communication between the anode chamber and the cathode chamber. An anode is provided in the anode chamber and a cathode is provided in the cathode chamber. A hollow sheet metal cylinder is disposed around the inner tube in the area of the bores between the cathode chamber and the anode chamber. The cylinder acts as a cathode cylinder member and is chargeable in its interior by one of the phases through bores located at the top of the cathode cylinder. Sheet metal strips are attached in a radially inwardly extending manner to the interior surface of the cathode cylinder.

7 Claims, 2 Drawing Figures

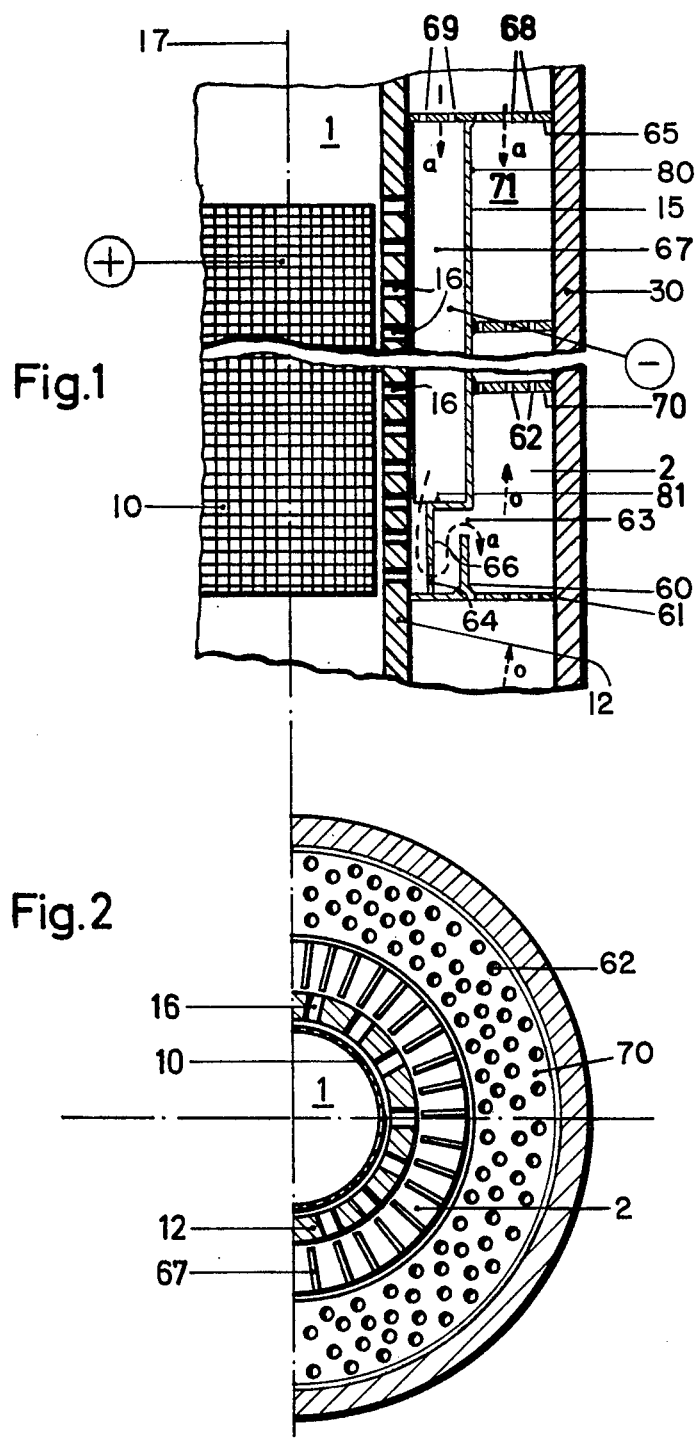

COUNTERCURRENT EXTRACTION COLUMN FOR LIQUID-LIQUID EXTRACTION

BACKGROUND OF THE INVENTION

The present invention relates to a countercurrent extraction column for the liquid-liquid extraction of two phases which are not soluble in one another with simultaneous electrolysis, including a column in which an anode chamber is enclosed by a cathode chamber without the use of a diaphragm to separate the chambers.

Countercurrent liquid-liquid extraction columns with simultaneous electrolysis are known in which a cathode chamber is separated from an anode chamber by a diaphragm, i.e., a membrane made of a porous ceramic material. The use of a diaphragm gives rise to major disadvantages for such a column, such as, for example, the fact that the pores of the diaphragm can become plugged up during operation of the column. To overcome the problems caused by diaphragms, the prior art has provided countercurrent liquid-liquid extraction columns with simultaneous electrolysis without the use of diaphragms to separate an enclosed anode chamber from the cathode chamber. Columns of this type without diaphragms are used, among other purposes, to separate uranium-plutonium compounds by means of liquid-liquid extraction. Such a column is described in U.S. Pat. No. 3,869,374 to Goldacker et al, issued Mar. 4, 1975, which is hereby incorporated by reference. The column described in U.S. Pat. No. 3,869,374 is designed so that electrolysis and extractive separation can take place simultaneously therein. A light (organic) phase is charged into the bottom of the column and a heavy (aqueous) phase is charged into the top of the column. The heavy phase is discharged at the foot of the column and the light phase is discharged at the head of the column. The electrolytic reduction of plutonium and uranium takes place in the extraction column at a cathode which is positioned in the cathode chamber and which is made of fins radially attached to the bottom of a perforated plate.

In U.S. Pat. No. 3,869,374, communication between the anode chamber and the cathode chamber is provided by a plurality of bores which are directed either downwardly or upwardly from the horizontal. The anodes are arranged at the level of the bores and the cathodes are arranged directly above the bores. In one embodiment of the column of U.S. Pat. No. 3,869,374, the bores are provided in a nozzle which is mounted in the wall which separates the anode chamber from the cathode chamber, and, in a further embodiment, the bores are formed directly in the wall which separates the anode chamber from the cathode chamber.

Due to the relatively long current paths in the column described in U.S. Pat. No. 3,869,374, there results a relatively high cell resistance which leads to unduly high temperatures and a significant voltage drop across the electrolysis portion of the column.

SUMMARY OF THE INVENTION

It is a primary object of the present invention to provide an improved liquid-liquid extraction column of the type described in U.S. Pat. No. 3,869,374 which does not contain a diaphragm.

A further object of the present invention is to provide such a column with an improvement in the separation effect and a reduction of the voltage drop.

A still further object of the present invention is to provide such a column which is particularly useful for the separation of plutonium and uranium within the framework of the so-called purex process.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, as embodied and broadly described, the present invention provides a countercurrent extraction column for a liquid-liquid extraction of two phases which are insoluble in each other with simultaneous electrolysis, the column comprising: an outer tube, an inner tube within the outer tube, with the inner tube dividing the column into an inner anode chamber and an outer cathode chamber which encloses the anode chamber without the use of a diaphragm, a plurality of bores establishing communication between the anode chamber and the cathode chamber, an anode in the anode chamber and a cathode in the cathode chamber, and a hollow sheet metal cylinder around the inner tube in the area of the bores between the cathode chamber and the anode chamber, the cylinder acting as a cathode member and being chargeable in its interior by one of the phases through bores at the top of the cylinder, and radially inwardly extending sheet metal strips attached to the interior surface of the hollow sheet metal cylinder.

In a preferred embodiment of the present invention, the cathode cylinder has a lower opening which is constricted by a further cylinder having a smaller diameter than the cathode cylinder. This further cylinder is provided with radially extending passages and a weir is arranged around these passages and forms an S-shaped annular gap with the further cylinder. Preferably, the weir is made of an annular sheet metal which is placed onto a perforated plate which is positioned at the bottom of the further cylinder.

It is to be understood that both the foregoing general description and the following detailed description are exemplary, but are not restrictive of the invention.

BRIEF DESCRIPTION OF THE DRAWINGS

The accompanying drawings, in which like numbers indicate like parts, illustrate an example of a presently preferred embodiment of the invention and, together with the description, serve to explain the principles of the invention.

Of the drawings:

FIG. 1 shows a partial, vertical, cross-sectional view of a countercurrent extraction column made in accordance with the teachings of the present invention.

FIG. 2 shows a horizontal, cross-sectional view of the column of FIG. 1.

DETAILED DESCRIPTION OF THE INVENTION

Referring to the drawings, there is shown a portion of a liquid-liquid extraction column which contains the improvements of the present invention and, in general, replaces the cathode and the nozzle section which permits communication between the anode and cathode chambers in the column described in U.S. Pat. No. 3,869,374. For purposes of clarity, the remainder of the column is not shown herein, and reference is made to U.S. Pat. No. 3,869,374 for other aspects of the column which can be used herein, such as means for feeding an aqueous phase into the top of the column, means for feeding an organic phase into the bottom of the column, and means for pulsing the liquid in the column.

As seen in FIG. 1, the countercurrent extraction column here comprises an outer upright tube 30 having a longitudinal axis 17 and coaxially therein an upright inner tube 12. The direction of flow of the aqueous phase from the top to the bottom is shown by arrows "a", and flow of the organic phase which rises from the bottom to the top is shown by arrows "o". A cylindrical anode chamber 1 is formed by the interior of inner tube 12, and a cylindrical cathode chamber 2, concentrically arranged about anode chamber 1 like a ring, is formed by the annular space between inner tube 12 and outer tube 30. An anode 10 is mounted in inner tube 12. Although only one anode 10 is shown in FIG. 1, it will be understood that the column can contain a plurality of axially spaced anodes which are electrically connected to each other as described in U.S. Pat. No. 3,869,374. In the area of each anode 10, the wall of inner tube 12 is provided with a series of bores 16 which provide communication between anode chamber 1 and cathode chamber 2. Bores 16 are axially spaced from each other at the level of anode 10, as shown in FIG. 1, and are uniformly distributed over the circumference of inner tube 12, as shown in FIG. 2. Bores 16 generally are coextensive with anode 10 in that they are provided along substantially the entire height of anode 10, as shown in FIG. 1. Bores 16 are perpendicular to axis 17 and provide a path for travel of ions to anode 10 and a cathode 15, described in greater detail hereafter, through an electrolyte.

A cathode 15 is provided for each anode 10 and is made of a sheet metal cylinder 80 whose interior radially inwardly extending sheet metal strips 67 are welded in uniform distribution over the circumference of cathode cylinder 15. These sheet metal strips 67 extend to inner tube 12, as best seen in FIG. 2, and are equally spaced circumferentially from each other.

The cylindrical surface 80 of cathode cylinder 15 is a closed surface and is positioned at a radial distance which is less than half the radial distance between inner tube 12 and outer tube 30, and, as shown in the embodiment of FIG. 1, is positioned at a radial distance which is about three-eighths of the distance between inner tube 12 and outer tube 30. As best seen in FIG. 1, cathode cylinder 15 is at the level of bores 16 so that at least some of the bores 16 are within the outline of cathode cylinder 15. In the embodiment shown in FIG. 1, the majority, that is, more than 50 percent, of bores 16 are within the outline of cathode cylinder 15.

The upper portion of cathode cylinder 15 is closed by means of an upper perforated plate 65. Perforated plate 65 is in the form of an annular ring which radially extends from inner tube 12 to outer tube 30, and is positioned a short distance above the top of anode 10. Perforated plate 65 contains a series of radially spaced axially extending bores, including central bores 69 which are within the outline of cathode cylinder 15 and permit flow into the area around metal strips 67 and outer bores 68 which are outside the outline of cathode cylinder 15 and open into the area outside cathode cylinder 15. The lower portion of cathode cylinder 15 contains a radially inwardly extending horizontal bottom 81, which is spaced from inner tube 12, and opens into a so-called baffle plate which comprises a short upright sheet metal cylinder 66 which has a smaller diameter than cathode cylinder 15. A lower perforated plate 61 in the form of an annular ring radially extends from inner tube 12 to outer tube 30 at the level of the bottom of anode 10. Cylinder 66 rests on the top surface of lower plate 61 and has a plurality of radially extending passages 64. Around these passages 64, a deflecting weir 60 is arranged in the form of a cylindrical metal sheet or sleeve, which rests on lower plate 61 and which has a height that is less than that of cylinder 66, so that an S-shaped annular gap 63 is produced between cathode cylinder 15 and weir 60.

An annular chamber 71 is produced between cathode cylinder 15 and outer tube 30 of the column, and two further perforated plates 70 having axially extending passages 62 are welded to cathode cylinder 15 in annular chamber 71. Perforated plates 70 have the same free area ratio as the perforated plates 61 and 65. The distance between upper perforated plate 70 and upper perforated plate 65 is the same as the distance between the lower perforated plate 70 and lower perforated plate 61.

Cathode cylinder 15, metal strips 67, baffle plate 66, deflecting weir 60 and perforated plates 61 and 65 preferably are made of titanium. The material for the perforated central tube 12 preferably is sintered $Al_2O_3$. The anode 10, which can be in the form of a basket, preferably is made of platinized tantalum. Anode 10, however, can be made of other materials, such as, for example, the basic materials niobium or hafnium which are coated with nobel metals or metal oxides.

The column is designed so that electrolysis and extractive separation can be performed in it at the same time. The light (organic) phase is fed in to cathode chamber 2 at the bottom, and the heavy (aqueous) phase is metered in at the top to cathode chamber 2. The heavy and the light phases leave at the bottom and the top of the column, respectively. The aqueous phase generally is used as a continuous electrically conducting phase and the organic phase as a discontinuous, non-conducting phase which is dispersed in the aqueous phase. Anode chamber 1 will contain mainly the aqueous phase and the organic phase will move upwardly in cathode chamber 2 which acts as an extraction chamber. A level control system can be used to establish a phase interface at the top of the column, as disclosed in U.S. Pat. No. 3,869,374, so as to make the aqueous electrically conducting phase the continuous phase which permits electrolysis to be carried out in the extraction chamber. As mentioned above, the column can be pulsed, i.e., pulsing is generated in the two phases contained in the column in order to establish a good contact required for a good extraction.

The present invention improves the structure of the cathode bottom that is disclosed in U.S. Pat. No. 3,869,374. Particular advantages of the new structure are the lowering of the cell voltage or of the electric resistance, respectively, by 55%, and an improvement in the separating effect between the organic and the aqueous phases, as compared to the column in U.S. Pat. No. 3,869,374.

The main difference of the present invention against the U.S. Pat. No. 3,869,374 is the missing of a cathode cylinder with a weir forming an S - shaped annular gap. The cathode only consists of fins radially attached to the bottom of a perforated plate instead of such fins being aditionally attached on the inside of a cylindrical metal sheeet as a cathode like the invention.

There are generally two essential advantages of the present invention with respect to the U.S. Pat. No. 3,869,374:

(1.) In the new embodiement the heavy (aqueous) phase remains still longer in contact with the cathode strips 67 whilst being unmixed with the light (organic) phase. From this results an extension of the anodes contact time.

(2.) A moving of the heavy phase from the anode compartment into the cathode compartment resulting in a re-oxidiing some of the reduced valuable materials can be largely prevented. This feature is be caused by said weir arrangement, i.e. the S - shaped gap, which is formed by the cylinder 66, the passage 64, the inner part of the lower plate 61 and the deflecting weir 60.

It will be understood that the above description of the present invention is susceptible to various modifications, changes and adaptations, and the same are intended to be comprehended within the meaning and range of equivalents of the appended claims.

What is claimed is:

1. In a countercurrent extraction column for a liquid-liquid extraction of two phases which are insoluble in each other, with simultaneous electrolysis, including: an outer tube, an inner tube within said outer tube, said inner tube dividing said column into an inner anode chamber and an outer cathode chamber which encloses the anode chamber without the use of a diaphragm, a plurality of bores establishing communication between said anode chamber and cathode chamber, an anode in said anode chamber, a cathode in said cathode chamber; the improvement comprising a hollow sheet metal cylinder around the inner tube in the area of the bores between the cathode chamber and the anode chamber, said cylinder acting as a cathode cylinder member and being chargeable in its interior by one of the phases through bores located at the top of the cylinder, and a plurality of radially inwardly extending sheet metal strips which are attached to the interior surface of said cylinder and which are distributed over the circumference of the cylinder.

2. Column as defined in claim 1 wherein the cathode cylinder has a lower opening which is constricted by a further cylinder having a smaller diameter than the cathode cylinder.

3. Column as defined in claim 2 wherein the further cylinder is provided with radially extending passages and a weir is arranged around these passages and forms an S-shaped annular gap with the further cylinder.

4. Column as defined in claim 3 wherein the weir comprises an annular metal sheet which is placed onto a perforated plate which is positioned at the bottom of the further cylinder.

5. Column as defined in claim 1 wherein the top of cathode cylinder is attached to the underside of a perforated plate, said perforated plate contains the bores located at the top of the cathode cylinder which lead into the interior of the cathode cylinder and contains further bores that lead to the area outside the cathode cylinder in the outer tube.

6. Column as defined in claim 1 wherein the cathode cylinder has a lower opening which is constricted by a further cylinder having a smaller diameter than the cathode cylinder, the further cylinder has radially extending passages, a weir is arranged around these passages and forms an S-shaped annular gap with the further cylinder, the weir comprises an annular metal sheet which is placed onto a lower perforated plate which is positioned at the bottom of the further cylinder; and the top of said cathode cylinder is attached to the underside of an upper perforated plate, said upper perforated plate contains the bores located at the top of the cathode cylinder which lead into the interior of the cathode cylinder and contains further bores that lead to the area outside the cathode cylinder in the outer tube.

7. Column as defined in claim 1 wherein at least some of the bores which establish communication between the anode chamber and cathode chamber are within the outline of the cathode chamber.

* * * * *